United States Patent
Wellstein et al.

(10) Patent No.: US 12,517,111 B2
(45) Date of Patent: Jan. 6, 2026

(54) SYSTEMS AND METHODS FOR IDENTIFYING AND ISOLATING INVASIVE SUBPOPULATIONS OF CANCER CELLS IN REAL-TIME

(71) Applicant: GEORGETOWN UNIVERSITY, Washington, DC (US)

(72) Inventors: Anton Wellstein, Washington, DC (US); Ghada M. Sharif, Washington, DC (US); Makarand Paranjape, Washington, DC (US); Leon Der, Washington, DC (US)

(73) Assignee: GEORGETOWN UNIVERSITY, Washington, DC (US)

( * ) Notice: Subject to any disclaimer, the term of this patent is extended or adjusted under 35 U.S.C. 154(b) by 1044 days.

(21) Appl. No.: 17/274,128

(22) PCT Filed: Sep. 9, 2019

(86) PCT No.: PCT/US2019/050220
§ 371 (c)(1),
(2) Date: Mar. 5, 2021

(87) PCT Pub. No.: WO2020/051587
PCT Pub. Date: Mar. 12, 2020

(65) Prior Publication Data
US 2022/0113298 A1    Apr. 14, 2022

Related U.S. Application Data

(60) Provisional application No. 62/728,415, filed on Sep. 7, 2018.

(51) Int. Cl.
*C12M 1/32*    (2006.01)
*C12M 1/00*    (2006.01)
(Continued)

(52) U.S. Cl.
CPC ......... *G01N 33/5005* (2013.01); *C12M 23/12* (2013.01); *C12M 23/20* (2013.01); *G01N 27/02* (2013.01); *G01N 33/6851* (2013.01)

(58) Field of Classification Search
CPC .......... G01N 33/5005; G01N 33/6851; G01N 27/02; C12M 23/12; C12M 23/44
(Continued)

(56) References Cited

U.S. PATENT DOCUMENTS

| 7,459,303 B2* | 12/2008 | Wang ............ G01N 15/12 |
| | | 435/297.5 |
| 7,927,867 B2* | 4/2011 | Khaldoyanidi ........ C12M 29/14 |
| | | 435/297.5 |
| 2006/0031210 A1* | 2/2006 | Allen ............ G16B 5/00 |

OTHER PUBLICATIONS

U.S. Appl. No. 18/849,375, filed Sep. 20, 2024, Wellstein.*
(Continued)

*Primary Examiner* — Gary Benzion
*Assistant Examiner* — Lisa Horth
(74) *Attorney, Agent, or Firm* — Blank Rome LLP

(57) ABSTRACT

Systems and methods for characterizing cancer cells are disclosed. In certain embodiments, the systems and methods involve coating a first chamber with ECM material and adding a first plurality of cells to the first chamber, adding media to a second chamber, and adding a second plurality of cells and media to a third chamber. The first, second, and third chambers are then clipped together to form a chamber array. The chamber array is mounted to an electric cell impedance sensing reader and impedance readouts of cell invasion are collected from the electric array at time intervals. Cells detected to invade into the second chamber are extracted and characterized.

4 Claims, 7 Drawing Sheets

(51) Int. Cl.
    *G01N 27/02* (2006.01)
    *G01N 33/50* (2006.01)
    *G01N 33/68* (2006.01)
(58) Field of Classification Search
    USPC .......................................................... 435/6.12
    See application file for complete search history.

(56) References Cited

OTHER PUBLICATIONS

Ryan, Use of Corning Cloning Cylinders [online] 2003 [retrieved on Feb. 14, 2024] retrieved from https://www.fishersci.co.uk/content/dam/fishersci/en_EU/suppliers/corning/cc_cloning_protocol_1_03_cls_an_041w.pdf (Year: 2003).*

Hassan, Saadia B. et al., Model for Time Dependency of Cytotoxic Effect of CHS 828 in Vitro Suggests Two Different Mechanisms of Action, The Journal of Pharmacology and Experimental Therapeutics, Copyright 2001, pp. 1140-1147, vol. 299, No. 3, The American Society for Pharmacology and Experimental Therapeutics, USA; Available online at http://jpet.aspetjournals.org.

Levasseur, Laurence M. et al., Modeling of the Time-Dependency of in Vitro Drug Cytotoxicity and Resistance, Cancer Research 58, pp. 5749-5761, Dec. 15, 1998, http://aacrjournals.org/cancerres/article-pdf/2468288/cr0580245749, Departments of Biomathematics [L.M., W.R.G.] and Experimental Therapeutics [L.M.L., H.K.S., Y.M.R., W.R.G.], Rosewell Park Cancer Institute, Buffalo, New York, 14263.

Sharif, Ghada M. et al, Real-Time Detection and Capture of Invasive Cell Subpopulations from co-cultures, JoVE Journal of Visualized Experiments, Copyright 2022, Mar. 2022, pp. 1-15, Lonbardi Comprehensive Cancer Center, Gerogetwon University Medical Center Department of Physics, Gerogetwon University, URL: jove.com/t/63512.

* cited by examiner

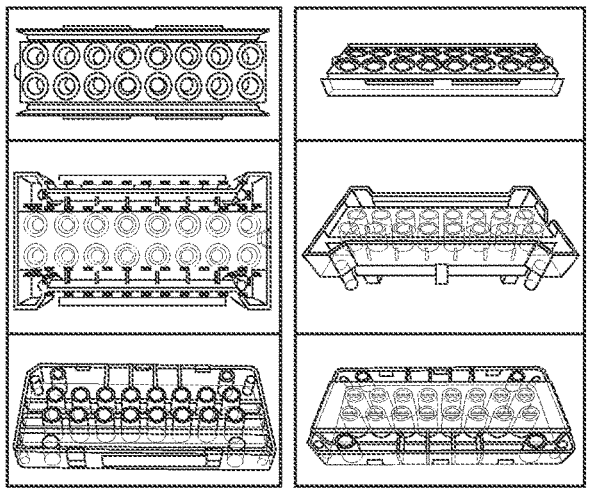
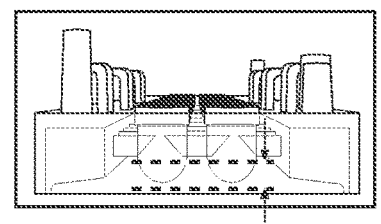

CHAMBER 3
(NEWLY FABRICATED FIXTURE)
302

CHAMBER 2
(MODIFIED FROM ORIGINAL)
304

CHAMBER 1
(UNMODIFIED FROM ORIGINAL)
306

- REMOVE 2mm OF ALL WELLS
- ATTACH POLYCARBONATE TRACK ETCH MEMBRANE FILTER USING ULTRA-THIN BIOCOMPATIBLE GLUE THAT SPANS AND SEALS EVERY WELL (AS SEEN IN LEFT 2 IMAGES).
- TRIANGULAR SNAPPING MECHANISM FROM CHAMBER 3 MATES WITH A SINGLE GROOVE (h=0.062" AND d= 0.040") CUT INTO THE TWO EXISTING "WING" STRUCTURES, SHOWN BY DASHED BOXES ON CHAMBER 2. THE GROOVE'S HORIZONTAL CENTER LINE LOCATION IS 0.071" FROM THE LONG EDGE.

- THE ORIGINAL POLYCARBONATE DEVICE (CHAMBERS 1 AND 2) SNAPS TOGETHER FOR ASSEMBLY AND USE.
- THE NEWLY FABRICATED FIXTURE (CHAMBER 3) HAS ALSO BEEN MADE FROM POLYCARBONATE, DESIGNED TO BE A TOOL-LESS ASSEMBLY.
- ALL 3 CHAMBERS OF THE DEVICE CAN BE SNAPPED TOGETHER.
- ADDITIONALLY, THE 3 CHAMBERS CAN BE UNSNAPPED TO RECOVER/HARVEST CELLS AND OTHER BIOMATERIALS.

*FIG. 3C*

SYSTEMS AND METHODS FOR IDENTIFYING AND ISOLATING INVASIVE SUBPOPULATIONS OF CANCER CELLS IN REAL-TIME

CROSS-REFERENCE TO RELATED APPLICATIONS

This application is a U.S. National Stage Application of International Application No. PCT/US2019/050220, filed on Sep. 9, 2019, which claims priority to U.S. Provisional Application No. 62/728,415, filed on Sep. 7, 2018, both of which are hereby incorporated herein by reference in their entirety.

GOVERNMENT LICENSE RIGHTS

This invention was made with government support under grant number CA071508 awarded by the National Institutes of Health. The government has certain rights in the invention.

FIELD OF THE INVENTION

The present invention relates to the field of cell-based assays. In particular, the invention provides impedance-based devices, apparatuses and systems for analyzing cells and for conducting cell-based assays.

BACKGROUND OF THE INVENTION

Bioelectronics is a progressing interdisciplinary research field that involves the integration of biomaterials with electronic devices. Bioelectronic methods have been used for analyzing cells and assaying biological molecules and cells. In one type of application, cells are cultured on microelectrodes and cell-electrode impedance is measured and determined to monitor cellular changes.

In PCT Application No. PCT/US03/22557, entitled "IMPEDANCE BASED DEVICES AND METHODS FOR USE IN ASSAYS", filed on Jul. 18, 2003, a device for detecting cells and/or molecules on an electrode surface is disclosed. The device detects cells and/or molecules through measurement of impedance changes resulting from the attachment or binding of cells and/or molecules to the electrode surfaces. A number of embodiments of the device are disclosed, together with the apparatuses and system for using such devices to perform certain cell based assays.

In anticancer drug development, the study of the time dependence of cytotoxic and cell proliferation inhibitory effect of a drug is an important element for gaining information to use in the development of clinical dosing strategies. In particular, time dependent IC50's are derived and different time dependent patterns for IC50's are observed (e.g., see Hassan S B, Jonsson E, Larsson R and Karlsson M O in *J. Pharmacology and Experimental Therapeutics*, 2001, Vol. 299, No. 3, pp 1140-1147; Levasseur L M, Slocum H K, Rustum Y M and Greco W R, in *Cancer Research*, 1998, vol. 58, pp 5749-5761.). Typically, these studies used end-point single-measurement assays. Each time point for a dose concentration of drug or compound applied to the cultured cells required a separate experiment. This limits the time resolution and the number of time points of such time-dependent cytotoxicity studies. Thus, new technologies or methods that can provide higher time resolution and permit measurements on many time points are needed.

The present invention further expands the systems disclosed in PCT Application No. PCT/US03/22557 and U.S. Pat. No. 7,470,533, entitled "IMPEDANCE BASED DEVICES AND METHODS FOR USE IN ASSAYS," filed on Nov. 10, 2003. That invention provides a real time cell electronic sensing system for conducting cell-based assays based on measurement of cell-substrate impedance and provides the method for using such a system to perform cell-based assays.

SUMMARY OF THE INVENTION

Described herein is a next-gen electric cell impedance sensing (ECIS) system to isolate and characterize invasive cancer cell subpopulations that are present in heterogeneous mixes of cell isolates from tumors. These subpopulations drive malignant progression to metastatic disease and are thus significant for in depth mechanistic studies and/or development of diagnostic tools for their detection, as well as for the development of inhibitors.

In certain embodiments, the present invention is a real-time monitoring system of the invasion of cancer cells that allows the harvesting of invasive cell subpopulations at user-defined time points for further characterization. Continuous monitoring of cell invasion allows the collection of individual cancer cells with different rates of invasion to characterize potential differences e.g by single cell RNA sequencing ("RNAseq").

In other embodiments, the present invention includes a real-time monitoring system of the invasion of cancer cells that allows a co-culture with other cells relevant for cancer cell invasion. The impact of other cell types (stromal and/or immune cells) on the invasion rate and invasive cell subpopulations selected can be assessed. At user-defined time points, the invasive cell subpopulation can be harvested for further characterization.

In yet other embodiments, the present invention involves an application of the invasion assays to heterogeneous cell populations from human tumors to separate out and collect invasive subpopulations at user-defined time points. This will allow molecular assessment of invasive subpopulations present in a cancer, test their sensitivity to drugs and inform clinical decision making. The approach allows for a short turnaround time to impact decision making in real time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3C is a diagram of the three chambers providing details of one possible embodiment of the present invention;

DETAILED DESCRIPTION OF THE PREFERRED EMBODIMENTS

Figure 1:
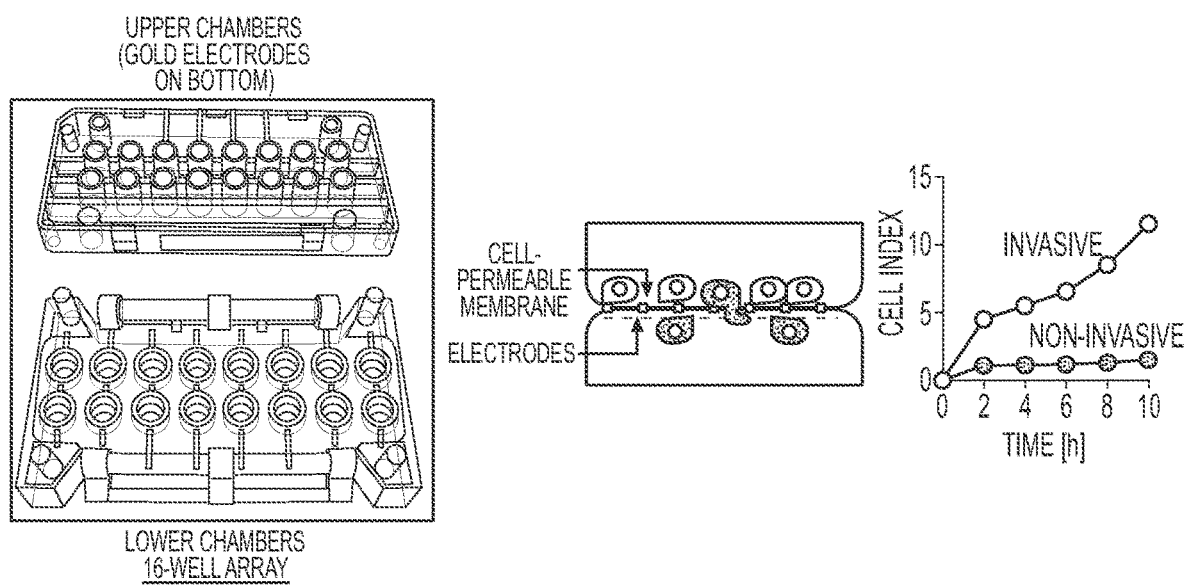
FIG. 1 is a schematic of a current technology dual-chamber ECIS system in accordance with previously known technology. A simulated graph of the expected output from invasive (white) and non-invasive cells (black/gray) obtained in real time is also shown.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

It is estimated that about 1.7 million new cases of cancer will be diagnosed in 2018, resulting in 0.6 million deaths. Primary cancers are frequently treatable by surgery, radiation or chemotherapy but a subpopulation of cancer cells that have gained invasive potential may invade locally and metastasize to distant organs, resulting in recurrence of disease, resistance to treatment, and fatal outcomes. Due to the heterogeneity of cancer cells in a primary tumor, it is imperative to identify which cell subpopulations are responsible for malignant progression and what distinguishes them from the less aggressive cells in a cancer. Additionally, tumors grow in a complex environment of stromal tissue that impacts their progression and metastasis, therefore it is crucial to study cancer cell invasion in the presence of stromal cells. Quail, D. F. & Joyce, J. A. Microenvironmental regulation of tumor progression and metastasis. *Nature Medicine* 19, 1423-1437 (2013).

Invasion and subsequent metastatic spread of invasive cells are the major cause of death from cancer (1, 2). Assays developed early on to measure the invasive potential of cancer cell populations typically generate a single endpoint measurement (3). Real-time monitoring of cell invasion by electric cell impedance sensing (ECIS) (4, 5) was a major step forward beyond this endpoint measurement. ECIS provides continuous measurements over time and thus can reveal differences in invasion rates that would go undetected in the endpoint assay (6-9). In the ECIS system (see FIG. 1 and FIG. 3A), cancer cells invade through an extracellular matrix that is coated onto a porous membrane and reach an interdigitated electrode array situated on the underside of the porous barrier. As these cells continue to attach and occupy the electrode array over time, a corresponding concurrent change in the electrical impedance results (8, 10) (see FIG. 2). These changes in impedance are measured continuously and captured in real-time, overcoming the limitations of an end point measurement.

Figure 2:
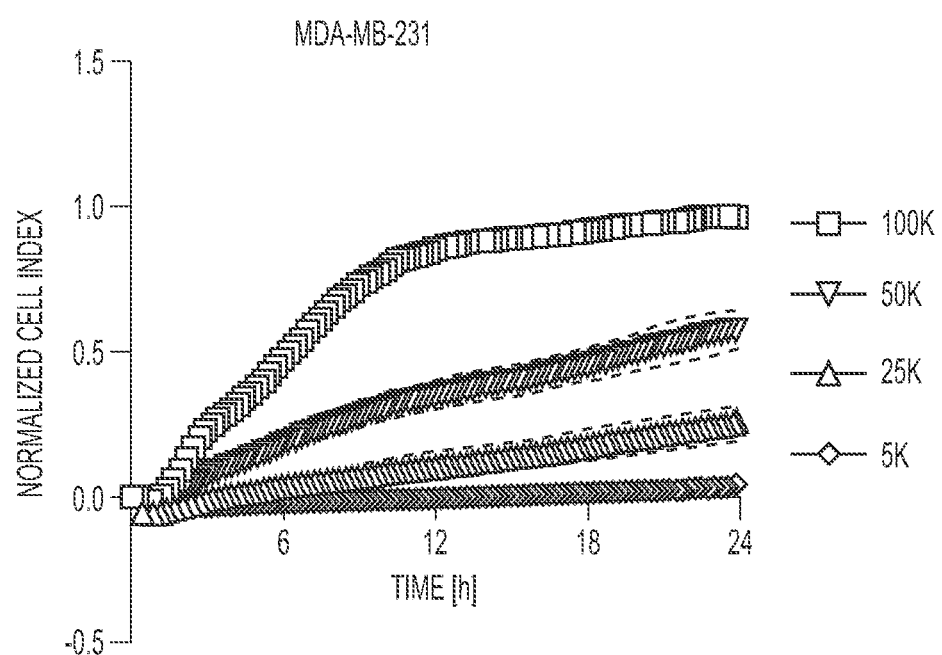
FIG. 2 is a graph of readouts from cell invasion in a current technology dual-chamber ECIS, which is shown in FIG. 1, where different numbers of MDA-MB-231 cells (5 k to 100 k) were added to the upper chamber and impedance was observed for 24 hours, and where Mean±SEM (dotted lines) are shown.

The set of experimental data shown in FIG. 2 includes different numbers of invasive cancer cells added to the conventional dual-chamber ECIS. With increasing numbers of cancer cells added to the top chamber the number of cells that can invade will rise. This is indicated by the increasing slope of the impedance measurement over time with increasing cell numbers added.

We have also been at the forefront in developing and applying real-time sensing for the assessment of endothelial cell invasion properties of tumors [see e.g. the webinar hosted by "Science" (6)] and have recently published the use of the ECIS system in comparison with zebrafish embryos to examine the intravasation and extravasation properties of heterogeneous cancer cell populations (8, 11, 12).

The present invention addresses at least the following two shortcomings in ECIS technology: (i) Lack of recovery of invasive cells: It is currently not possible to recover invasive cancer cells to then analyze the features of invasive subpopulations present in heterogeneous cancer cell populations' and (ii) Lack of co-culture options: It is currently not possible to assess the impact of secreted factors from co-cultured stromal or immune cells on the selection of invasive subpopulations present in heterogeneous cancer samples.

Overcoming these shortcomings is important for the analysis of mixed populations of cells derived from freshly harvested human tumors, in particular surgical specimen and tumor biopsies, from conditional reprogramming of freshly isolated cancer cells (CRC) or from patient-derived xenograft (PDX) models. CRC is a method for immortalization of freshly harvested cancer cell populations that was developed at our Cancer Center with support from NCI's IMAT program (13-18).

The approach described herein can uncover malignantly progressed cancer cell subpopulations present in heterogeneous biological samples that includes freshly obtained tumor biopsies or surgical specimen. The new capacity of the next-gen ECIS technology described here provides a functional assay to isolate invasive subpopulations from heterogeneous cancer cell mixtures that contain more and less invasive cancer cells and can also contain normal epithelial cells, stromal and immune cells. Analysis of invasive and outcome-relevant cancer cell subpopulations is essential for appropriate mechanistic studies, molecular insights not obtainable or biased by the analysis of a mixed cell population and the study of drug sensitivity or drug resistance of the clinically most relevant, i.e. the invasive cell subpopulation.

The molecular analyses of invasive cancer cell subpopulations as performed in accordance with the present invention will impact the understanding of research findings and interpretation of cancer biomarkers or drivers. Also, sensitivity to drug treatment of the invasive subpopulations isolated will likely differ from the sensitivity or resistance of mixed populations and can provide a new understanding of responses to drug treatment.

Approach

Figure 3A:
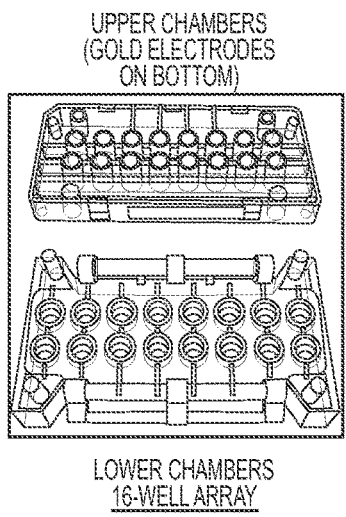
FIG. 3A is a diagram of a current technology ECIS system to indicate the different elements in accordance with the present invention.

Described herein is next-generation ("next-gen") real-time invasion monitoring that includes: (i) capture of the invasive cell subpopulations from heterogeneous cell mixtures for further analyses, and (ii) assessment of the impact of co-cultured stromal or immune cells on the invasive properties of cancer cells. We plan to generate the next-gen ECIS system by incorporating matching chambers within an additional lower compartment that aligns with the electrode array and allows for auxiliary seeding of stromal cells to monitor their influence on invasion. Furthermore, the new attachment can be opened to recover live, invading cells at any chosen time point. These next-gen ECIS arrays will allow us to monitor cancer cell invasion in real time and isolate invasive subpopulations from heterogeneous cancer cell populations under different stromal cell influence at chosen time points. FIG. 3A provides a graphical overview of the current ECIS technology while FIGS. 3B, 3C, 3D and FIG. 4 illustrate the enhanced next-gen ECIS device.

FIG. 3A shows the approach for monitoring cell invasion by real-time electric cell impedance sensing (ECIS). A picture of a current 16-well array lower and upper chamber is shown (xCelligence® Inc.). The size of the wells is matched to standard 96-well plates. Up to 200 IA fit into the upper chamber. The schematic drawing shows one assembled chamber with cells. Note: The cell permeable membrane is coated with extracellular matrix materials (e.g. Matrigel®; not shown).

Figure 3B:
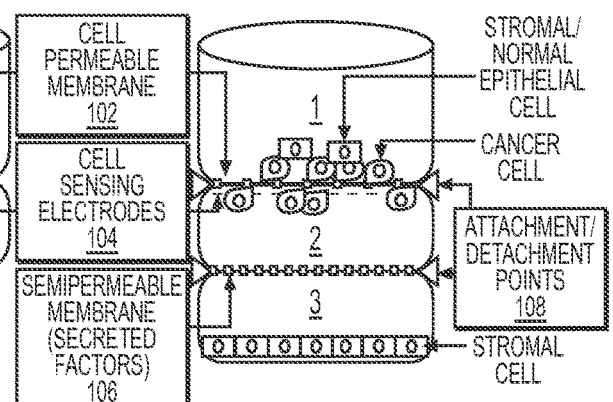
FIG. 3B is a diagram of an improved ECIS system in accordance with an embodiment of the present invention.

FIG. 3B shows how next-gen technology is used to monitor cell invasion in real-time, harvest invasive cells for further characterization and test the impact of co-cultured cells. Chamber #1: Add cells. Mixtures of normal and cancer cells can be added. The bottom of the chamber is a cell permeable membrane 102 that is coated with extracellular matrix materials (e.g. Matrigel®; not shown). Cell sensing electrodes 104 are attached to the opposite side of this membrane to detect cells that have invaded. Chamber #2: Invasive cells can be harvested after detaching this chamber. Chamber #3: Separated from chamber #2 by a membrane that is permeable for proteins and small molecule drugs. Cells that produce chemoattractants can be grown in this chamber. The technical details and machining of the chambers as one possible embodiment of the current invention are provided in FIG. 3C and FIG. 3D. Note: The chambers are generated in a 16-well format that fits into the current ECIS reader from xCelligence®.

FIG. 3C is a diagram of an improved ECIS system in accordance with an embodiment of the present invention. As shown, chamber #3 302 is a newly fabricated fixture, while chamber #2 304 is modified from the original and chamber #1 306 is unmodified from the original. Chamber #1 306, chamber #2 304, and chamber #3 302 are preferably designed to snap together and be unsnapped as necessary for assembly and use. Chamber #1 306, chamber #2 304, and chamber #3 302 are also preferably made from polycarbonate, such that the assembly is tool-less. In certain embodiments, it is preferable to remove 2 mm off all wells in the assembled system. That can be done by attaching a polycarbonate track etch membrane filter using ultra-thin biocompatible glue that spans and seals every well. In such a configuration, a triangular snapping mechanism from chamber #3 302 mates with a single groove cut into two existing "wing" structures of chamber #2 304, shown by the dashed boxes around portions of chamber #2 304 in FIG. 3C. In certain embodiments, the groove's horizontal center-line location is 0.071 inches from the long edge of chamber #2 304.

Figure 3D:
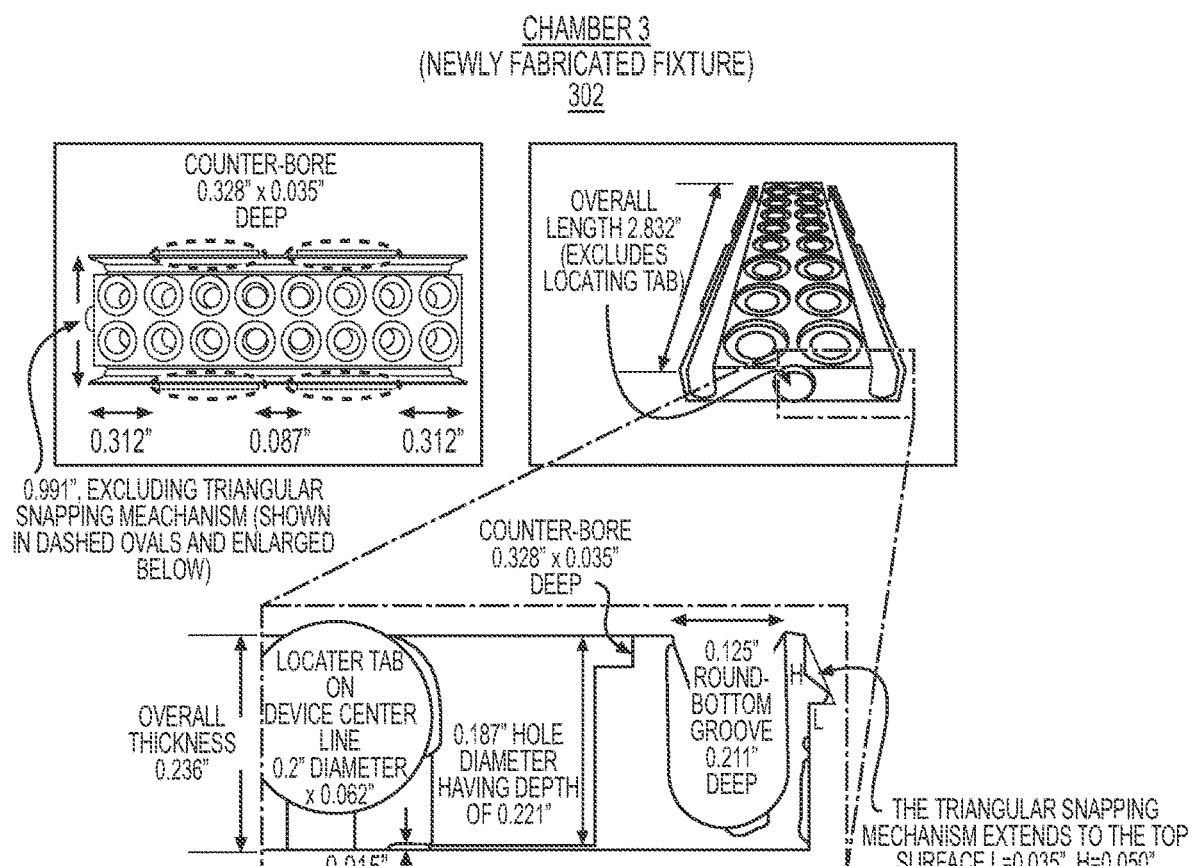
FIG. 3D is a diagram of chamber #3 providing details of one possible embodiment of the present invention.

FIG. 3D is a diagram of chamber #3 302 providing details of one possible embodiment of the present invention. In that exemplary embodiment, chamber #3 has a width of 0.991 inches, excluding the triangular snapping mechanisms. The triangular snapping mechanisms are preferably 0.312 inches from the right and left edges of chamber #3 302. The two triangular snapping mechanisms shown on each side are 0.087 inches apart and extend to the top surface of the chamber. In FIG. 3D, those triangular snapping mechanisms have a length of 0.035 inches and a height of 0.050 inches. The overall length of chamber #3 is 2.832 inches, excluding the tab. The counter-bores in chamber #3 302 are preferably 0.328 inches by 0.035 inches deep. The wells in chamber #3 302 have an overall thickness of 0.236 inches. The wells have a locator tab on the device center line with a diameter of 0.2 inches by 0.062 inches depth. The wells each have a 0.187-inch hole diameter and a depth of 0.221 inches. The wells each also have a round-bottom groove of 0.125 inches.

Figure 4:
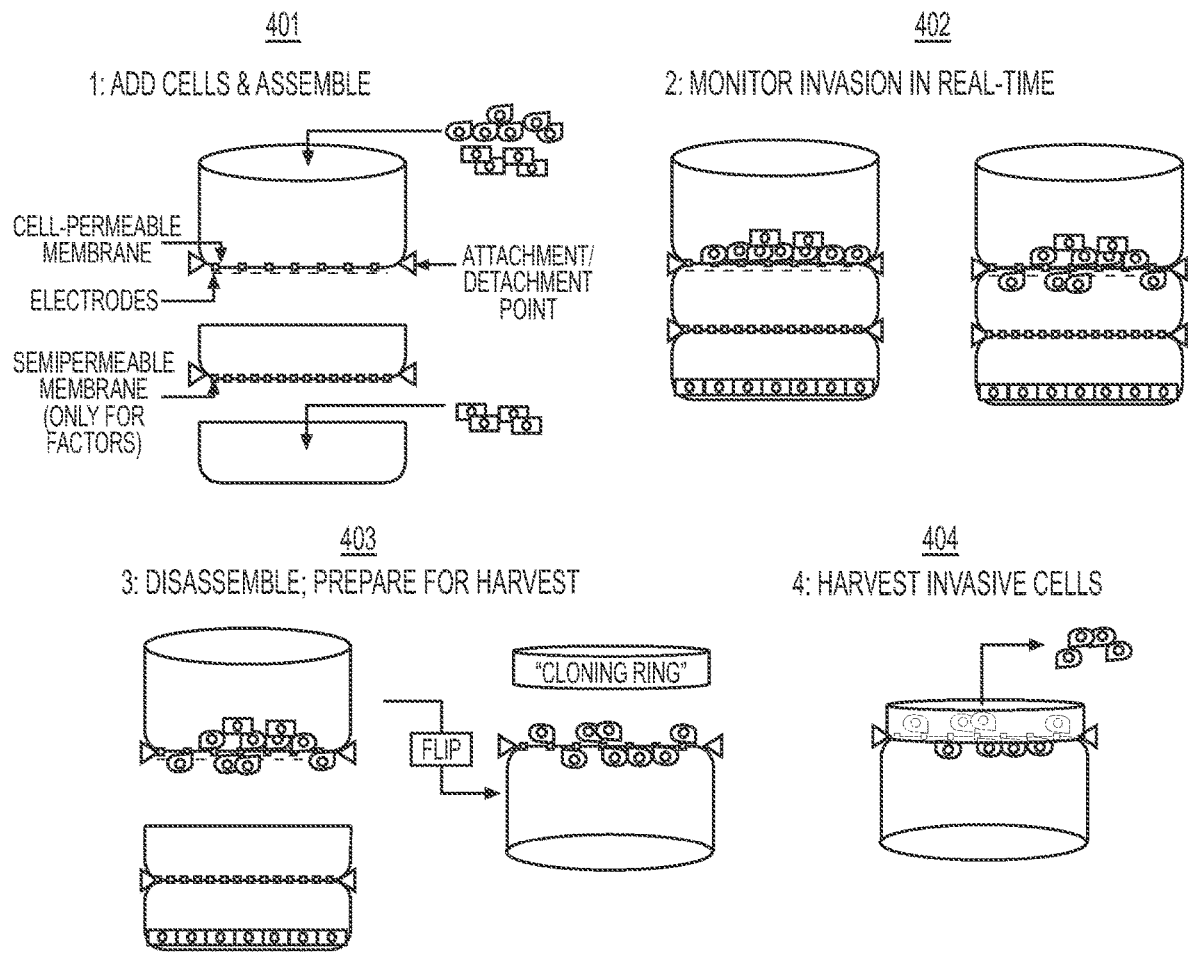
FIG. 4 is diagram of the steps performed in characterizing cells in an ECIS system, in accordance with the present invention.

FIG. 4 illustrates the steps in the assembly, invasion monitoring and disassembly of the ECIS array. Chamber #1 comprises the existing 16-well ECIS electrode array that fits into the xCelligence® equipment (see photo in FIG. 3A, "upper chambers"). The array is commercially available from xCelligence®, and the reader is currently used in the Wellstein lab to analyze current technology ECIS assays [Refs e.g. (8, 9, 19)]. In certain embodiments, chamber #2 carries a semipermeable membrane 106 as a bottom, which can be attached and detached from chamber #1 and will contain tissue culture media. Chamber #3 will contain tissue culture media with or without stromal cells for co-culture experiments and other additions (e.g. small molecule drugs, antibodies, cytokines, growth factors). Chamber #2 and #3 are assembled at the initiation of the experiments but do not need to be detached from each other using the attachment/detachment points 108 until the end of the experiment.

FIG. 4 also shows the operation of the next-generation ECIS array. Such operation preferably includes the following steps:

At step 401, "1: add cells & assemble," under a tissue culture hood, stromal cells and media are added to chamber #3. Chamber #2 is clipped onto chamber #3 and filled with media. The bottom of chamber #1 is coated with ECM material (Matrigel®). Cells and media are added to chamber #1. Chamber #1 is clipped onto the assembled chamber #2 and #3.

At step 402, "2: monitor invasion in real-time," the assembled ECIS array is mounted onto the ECIS real-time reader located in a tissue culture incubator with $CO_2$. The impedance readout is captured by a computer connected to the reader.

At step 403, "3: disassemble; prepare for harvest," at defined time points based on the read-out of the impedance measurements, the ECIS array is disassembled under a tissue culture hood. After removal of media from chamber #1, the lower portion of the cell-permeable membrane of chamber #1 is exposed. A cloning ring is added to harvest cells that invaded through the membrane.

At step 404, "4: harvest invasive cells," after incubation with detachment media (e.g. trypsin or EDTA), the invasive cells are harvested and can be used for further culture and testing or characterization by staining or by single cell RNAseq or other single cell analysis such as cytometry by time or flight, or CyTOF® (Mass Spectrometry for single cell proteomics analysis; e.g. FLUIDIGM.com).

Invasion monitoring as shown in FIG. 2 is used for a functional test and serves as a milestone. The xCelligence® reader can accommodate and collect recordings from up to three 16-well arrays independent from each other. Thus, next-gen (three-chamber) and current technology (dual-chamber) ECIS array functional testing can be carried out on the reader at the same time with parallel recording.

Figure 5:
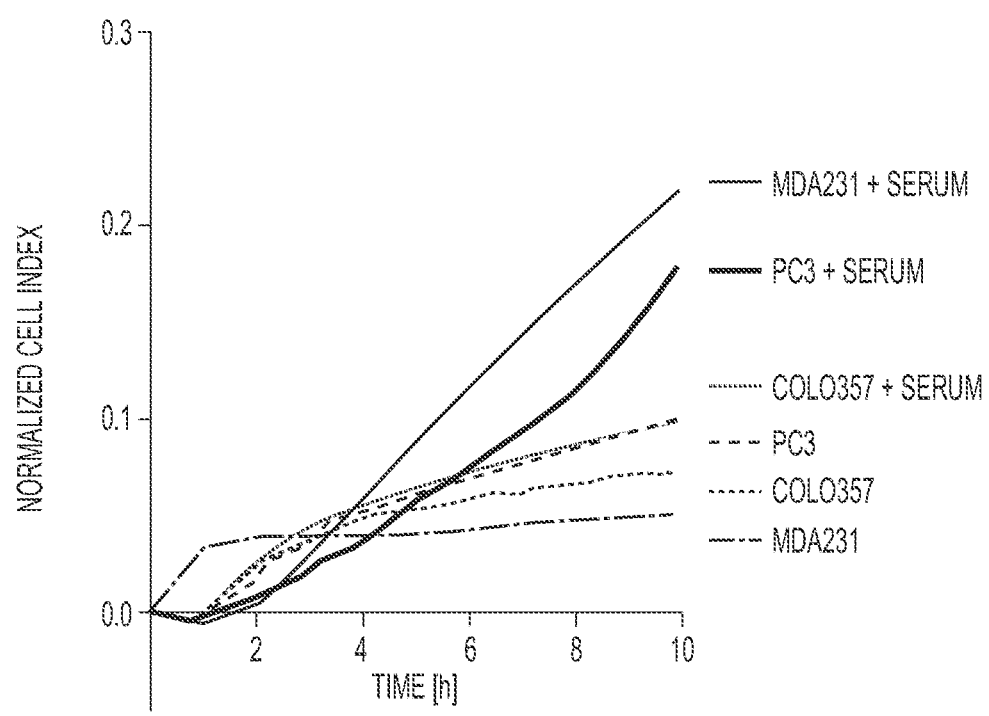
FIG. 5 is a graph showing serum stimulation of cancer cell invasion using a dual-chamber ECIS array, where, in the presence of serum, the invasion of MDA-MB-231 cells is enhanced, while the effect of serum on Colo357 and PC-3 cells is less pronounced.

Both arrays will be run with the same set of cells that are serially diluted from 100,000 to 5,000 per well. MDA-MB-231 human breast cancer cells were one prototype cancer cell type used in the testing of the device. The results of a prototype experiment with previously known technology is shown in FIG. 2. Additional cell types used are human pancreatic cancer cells Colo-357 and human prostate cancer cells PC-3. FIG. 5 includes those cells. As shown in those figures, the slope of the impedance changes over time, reflecting cell invasion. Also, when higher numbers of cancer cells are added to chamber #1, more cells will invade over time and a steeper slope is observed (see FIG. 2).

Testing is performed for statistically significant differences (by ANOVA) between the slopes recorded for different cell lines and cell numbers when comparing next-gen and current technology. Four dilutions of cells (each run in duplicate wells), three different cell lines and three repeat experiments are typically used for such an analysis. Chamber #1 is from the same batch of 16-well arrays commercially available.

Another test is run to determine the sensitivity of detection of invading cells and the number of live cells that can be recovered after invasion. For this, the next-gen ECIS array is run with a set of serially diluted cells at 100,000, 50,000 and 25,000 cells per well. That would be commensurate with a small aliquot from a tumor fine-needle biopsy either directly from a patient's tumorous lesion or from the biopsy of a surgically removed cancer specimen obtained directly after completion of surgery. The results of an experiment with the previously known technology is shown in FIG. 2. When higher numbers of cancer cells are added to chamber #1, more cells invade over time and a steeper slope is observed. Typically three next-gen arrays are run in parallel and invading cancer cells harvested at 6, 12 and 24 hours as shown in FIG. 4 (step 404). One aliquot of invading cells harvested is counted and can be subjected to further analysis as described above (single cell RNAseq or CyTOF®), another aliquot cultured in fresh dishes to assess cell viability. Cell will be counted prior to plating and can be subjected to further studies, e.g. for drug sensitivity.

The percentage of invading cells recovered at different times relative to the number of cells added to the well and relative to the time allowed for the invasion can be determined. For a given sample of cells from a tumor biopsy specimen or an established cell line (CRC) we expect a linear relationship between the impedance reading and the number of invading cells recovered.

The correlation between all impedance readings (irrespective of the time of cell harvest) is analyzed versus the number of cells harvested. Regression and correlation analysis is used for statistical comparison. In a separate analysis, the time of harvest and cell number are correlated. Furthermore, the number of viable invasive cells (after plating) are compared with the number of invasive cells harvested initially. It is expected that the number of viable cells will be >90%. The analyses is done separately for each sample of cells from a tumor biopsy specimen or an established cell line (CRC).

Another objective is to determine the impact of stromal cells in the lower chamber on the rate of invasion of cancer cells and on changes in the invasive subpopulation. Tumor stroma consists of different mesenchymal cell types and can alter the invasive behavior of cancer cells substantially [reviewed in (20)]. Monocytes can profoundly influence the invasion of epithelial cells and we will thus examine stromal influences on invasion by determining if monocytes enhance or inhibit the ability of cancer cells to invade. For these experiments we can add monocytes derived from established cell lines (e.g. THP-1, see below) or patient derived monocytes (from a blood draw) to chamber #3.

THP-1 monocytic cells, human bone marrow-derived monocytes or peripheral blood-derived monocytes can be used as stromal cells that are added to chamber #3. Bone marrow cells were isolated earlier from discarded filters that collect bone marrow debris during collection and are not suitable for transplant. THP-1 cells can be differentiated into different lineages if needed for further analysis. The addition of serum is used as a positive stimulatory control (see effect in FIG. 5).

Chamber #3 in the next-gen ECIS array can be seeded with THP-1 or other monocytic cells and attached to chamber #2 (see FIG. 4). A negative control will be chamber #3 without monocytic cells. A positive control will be the addition of serum to chamber #3 as a chemoattractant. FIG. 5 shows the results of a prototype experiment of the effect of serum on the invasion of different cancer cell lines using the previously known dual-chamber ECIS system. MDA-MB-231 cells appear to be the best candidate to elicit a differential response by added factors (serum in this case) or factors secreted from monocytic cells.

For the prototype experiment, serially diluted MDA-MB-231 cells at 100,000, 50,000, 25,000 and 5,000 cells per well are used. The results of the cell dilution experiment with the previously known dual-chamber ECIS technology are shown above in FIG. 2. When higher numbers of cancer cells are added to chamber #1, more cells invade over time and a steeper slope is observed. Impedance will be monitored for 24 hours and invading cancer cells harvested at the end of the 24-hour monitoring period (FIG. 4; step 404). The harvested invading cells will be counted and the cell counts compared with the slope of the impedance curves.

In yet another experiment, the effect of monocytic cells and of the addition of serum on the slope of the impedance sensing curves and on the number of invading cells recovered at the end of the experiment is determined. It is expected that the fold increase in the slope of the impedance sensing curve and fold increase in invading cells is similar for a given cell number. The test is conducted for potential differences using a t-test. $p<0.05$ will be set as significant. We will also test the correlation between the number of cancer cells added and the induction of invasion by serum or by added monocytic cells. We expect that the induction of invasion will be less with higher cancer cell numbers: FIG. 2 shows saturation at the highest cell number after 6 hours. To analyze the data, we will use non-linear regression analysis. We expect to see a >2-fold effect on the number of invasive cells recovered in the presence of serum and/or the presence of monocytic cells for either of the 5,000, 25,000 or 50,000 MDA-MB231 cells added. The experiment is repeated three times at separate times to assess reproducibility.

There are pitfalls associated with this test. If the THP-1 cells do not impact invasion as detected by the impedance slope or number of invasive cells, bone marrow cells or patient-derived peripheral blood monocytes may be used. Alternatively, differentiation of the THP-1 cells into macrophages may be considered due to the impact of macrophages on cancer cell invasion and as a target cell for therapy (21, 22),(23, 24).

Another experiment can be performed with this device to determine the detection threshold of invasive subpopulations of cancer cells present in heterogeneous mixtures of cells. An important question is to what extent tumor heterogeneity will affect the assessment of invasive capacity in the ECIS assay. We can determine the threshold of recovery of invasive cells present in a mixture with normal or non-invasive cells. To address this, one can perform mixing experiments of invasive and non-invasive cells at different ratios such as 0, 5, 25, 50, 75, 90, 95 and 100% of the invasive cell population replaced with an equivalent number of normal or non-invasive tumor cells from the same tissue type (see Table 1). Thus, the total number of cells added will remain the same but the proportion of cells that are invasive will be progressively changed. One could use 50,000 cells per well and mix MDA-MB-231 cells with MCF-10A cells. From patient samples either of these two cell lines could be admixed to calibrate the assay. To distinguish the mixed cell types they will first be stained with different lipophilic dyes as shown by us earlier. We used the dye system to label differently invasive cells co-injected into zebrafish and saw a retention of the dyes over a >24 hour observation periods of vascular invasion (8). Here, the experiment would be run for a maximum of 24 hours. After the appropriate time showing signals of invasion, the invasive cells are harvested (see FIG. 4, step 404), counted and plated for imaging to evaluate whether non-invasive cells followed the invasive cells along. Such potentially "collective invasion" (25)) would be detectable, quantifiable and thus taken into account.

In a follow-up experiment, the experiment will be run for a shorter time (6 to 12 hours) depending on the outcome of the above 24 hour maximum time period and invasive cells harvested and analyzed thereafter. The comparison of impedance sensing and invasive cells harvested at different time points will provide insight into the optimization of the capture of invasive cells based on the real-time read-out.

At the end of this analysis can determine the minimum number of invasive cells present in a heterogeneous mix that enable detection of the invasion. One will also have determined if the number of invasive cells detected is related to the number of cells present in a mixture (linearity of the assay). These results enable an investigator to estimate how many invasive cells are needed in a heterogeneous mix to determine invasive capability and reveal the limits of sensitivity of potential assays with human tumor-derived samples.

TABLE 1

| Tissue type | Invasive | Non-invasive |
| --- | --- | --- |
| Breast cancer | MDA-MB-231 | MCF-DCIS |
| non-invasive & normal | PDX HCC-1 | MCF10A |
| human breast epithelial | PDX HCC-10 | HBEC |
| (PDX & CRC) | CRC 1 - 6 | |
| Pancreas | Colo-357 | |
| Prostate | PC3 | epithelia CRC |
| Stromal cells: bone marrow monocytes, THP-1 cells | | |

Potential Pitfalls and Alternate Approaches:
Cell Lines.

Heterogeneous populations of epithelial cells are derived directly from human PDX samples from triple negative breast cancer (TNBC) patient samples that we have obtained from Dr Alana L. Welm (26). These transplantable tissue fragments were derived from patient samples at the Huntsman Cancer Institute (HCI) and have been shown on serial transplantation in NOD/SCID mice to retain phenotype and gene expression profile over multiple serial passages. We have obtained fragments from samples HCC1 and HCC10 (26). HCC1 was derived from a patient with basal-like TNBC who developed lung metastasis who had not received systemic treatment at the time of sample collection. HCC10 was also derived from a patient with basal-like TNBC who had lung metastasis but who had received treatment with multiple chemotherapeutic agents at the time of sample collection. We have derived CRC lines from these two tumors by digesting the tumor to organoids and then harvesting epithelial cells for culture in the CRC system as described previously by us (14, 27).

Extracellular matrix (ECM). The ECM can produce profound changes in the invasive behavior of epithelial cells [(28-30) reviewed in (31)]. It has also been suggested that transition from a non-invasive to an invasive cell phenotype is in part governed by the ECM chemical composition as well as by the ECM architecture (32). Matrigel® is frequently used as ECM media and is a mixture of proteins enriched in basement membrane proteins such as laminin and type IV collagen (33). Matrigel® provides essential ligands for integrin adhesion and is used here. We use a single batch for the experiments.

REFERENCES CITED

1. Fidler I J (2003) The pathogenesis of cancer metastasis: the 'seed and soil' hypothesis revisited. *Nature Reviews Cancer* 3:453-458. PMID: 12778135
2. Nguyen D X, Bos P D, Massagué J (2009) Metastasis: from dissemination to organ-specific colonization. *Nature reviews Cancer* 9:274-284. PMID: 19308067
3. BOYDEN S (1962) The chemotactic effect of mixtures of antibody and antigen on polymorphonuclear leucocytes. *The Journal of experimental medicine* 115:453-466. PMID: 13872176
4. Wegener J, Keese C R, Giaever I (2000) Electric cell-substrate impedance sensing (ECIS) as a noninvasive means to monitor the kinetics of cell spreading to artificial surfaces. *Experimental Cell Research* 259:158-166. PMID: 10942588
5. Giaever I, Keese C R (1984) Monitoring fibroblast behavior in tissue culture with an applied electric field. *Proceedings of the National Academy of Sciences of the United States of America* 81:3761-3764. PMID: 6587391
6. Wellstein A (2010) Real-time, label-free monitoring of cells in cancer research. *Science Webinar Series: "Advancing Cancer Research"* (Science, AAAS Washington D.C., USA).
7. Stylianou D C, Auf der Maur A, Kodack D P, Henke R T, Hohn S, Toretsky J A, Riegel A T, Wellstein A (2009) Effect of single-chain antibody targeting of the ligand-binding domain in the anaplastic lymphoma kinase receptor. *Oncogene* 28:3296-3306. PMID: 19633684
8. Sharif G M, Schmidt M O, Yi C, Hu Z, Haddad B R, Glasgow E, Riegel A T, Wellstein A (2015) Cell growth density modulates cancer cell vascular invasion via Hippo pathway activity and CXCR2 signaling. *Oncogene* 34:5879-5889. PMID: 25772246
9. Berens E B, Sharif G M, Schmidt M O, Yan G, Shuptrine C W, Weiner L M, Glasgow E, Riegel A T, Wellstein A (2017) Keratin-associated protein 5-5 controls cytoskeletal function and cancer cell vascular invasion. *Oncogene* 36:593-605. PMID: 27375028
10. Bird C, Kirstein S (2009) Real-time, label-free monitoring of cellular invasion and migration with the xCELLigence® system. *Nature methods* 6, v-vi; DOI: 10.1038/nmeth.f.263
11. Berens E B, Holy J M, Riegel A T, Wellstein A (2015) A cancer cell spheroid assay to assess invasion in a 3D setting. *Journal of visualized experiments: JoVE* e53409: 1-21. PMID: 26649463
12. Berens E B, Sharif G M, Wellstein A, Glasgow E (2016) Testing the Vascular Invasive Ability of Cancer Cells in Zebrafish (Danio Rerio). *Journal of Visualized Experiments* PMID: 27842376
13. Chapman S, Liu X, Meyers C, Schlegel R, McBride A A (2010) Human keratinocytes are efficiently immortalized by a Rho kinase inhibitor. *The Journal of clinical investigation* 120:2619-2626. PMID: 20516646
14. Saenz F R, Ory V, AlOtaiby M, Rosenfield S, Furlong M, Cavalli L R, Johnson M D, Liu X, Schlegel R, Wellstein A, Riegel A T (2014) Conditionally reprogrammed normal and transformed mouse mammary epithelial cells display a progenitor-cell-like phenotype. *PloS one* 9:e97666. PMID: 24831228
15. Suprynowicz F A, Upadhyay G, Krawczyk E, Kramer S C, Hebert J D, Liu X, Yuan H, Cheluvaraju C, Clapp P W, Boucher R C, Kamonjoh C M, Randell S H, Schlegel R (2012) Conditionally reprogrammed cells represent a stem-like state of adult epithelial cells. *Proceedings of the National Academy of Sciences of the United States of America* 109:20035-20040. PMID: 23169653
16. Yuan H, Myers S, Wang J, Zhou D, Woo J A, Kallakury B, Ju A, Bazylewicz M, Carter Y M, Albanese C, Grant N, Shad A, Dritschilo A, Liu X, Schlegel R (2012) Use of reprogrammed cells to identify therapy for respiratory papillomatosis. *The New England journal of medicine* 367:1220-1227. PMID: 23013073
17. Liu X, Ory V, Chapman S, Yuan H, Albanese C, Kallakury B, Timofeeva O A, Nealon C, Dakic A, Simic V, Haddad B R, Rhim J S, Dritschilo A, Riegel A, McBride A, Schlegel R (2012) ROCK inhibitor and feeder cells induce the conditional reprogramming of epithelial cells. *The American Journal of Pathology* 180: 599-607. PMID: 22189618
18. Liu X, Krawczyk E, Suprynowicz F A, Palechor-Ceron N, Yuan H, Dakic A, Simic V, Zheng Y-L, Sripadhan P, Chen C, Lu J, Hou T-W, Choudhury S, Kallakury B, Tang D, Darling T, Thangapazham R, Timofeeva O, Dritschilo A, Randell S H, Albanese C, Agarwal S, Schlegel R (2017) Conditional reprogramming and long-term expansion of normal and tumor cells from human biospecimens. *Nature Protocols* 12:439-451. PMID:
19. Tassi E, Mcdonnell K, Gibby K A, Tilan J U, Kim S E, Kodack D P, Schmidt M O, Sharif G M, Wilcox C S, Welch W J, Gallicano G I, Johnson M D, Riegel A T, Wellstein A (2011) Impact of fibroblast growth factor-binding protein-1 expression on angiogenesis and wound healing. *The American Journal of Pathology* 179:2220-2232. PMID: 21945411
20. Gore J, Korc M (2014) Pancreatic Cancer Stroma: Friend or Foe? *CCELL* 25:711-712. PMID:
21. Morrison C (2016) Immuno-oncologists eye up macrophage targets. *Nature Reviews Drug Discovery* 15:373-374. PMID: 27245386
22. Cassetta L, Pollard J W (2017) Repolarizing macrophages improves breast cancer therapy. *Cell Research* 1-2. PMID:
23. Villanueva M T (2017) Anticancer therapy: Re-educating macrophages. *Nature Reviews Drug Discovery* 16:313-313. PMID:
24. Gordon S R, Maute R L, Dulken B W, Hutter G, George B M, McCracken M N, Gupta R, Tsai J M, Sinha R, Corey D, Ring A M, Connolly A J, Weissman I L (2017) PD-1 expression by tumour-associated macrophages inhibits phagocytosis and tumour immunity. *Nature* 1-13. PMID:
25. Friedl P, Locker J, Sahai E, Segall J E (2012) Classifying collective cancer cell invasion. *Nature cell biology* 14:777-783. PMID: 22854810
26. Derose Y S, Wang G, Lin Y-C, Bernard P S, Buys S S, Ebbert M T W, Factor R, Matsen C, Milash B A, Nelson E, Neumayer L, Randall R L, Stijleman I J, Welm B E, Welm A L (2011) Tumor grafts derived from women with breast cancer authentically reflect tumor pathology, growth, metastasis and disease outcomes. *Nat Med* 17:1514-1520. PMID: 22019887
27. Liu X, Ory V, Chapman S, Yuan H, Albanese C, Kallakury B, Timofeeva O A, Nealon C, Dakic A, Simic V, Haddad B R, Rhim J S, Dritschilo A, Riegel A, McBride A, Schlegel R (2012) ROCK inhibitor and feeder cells induce the conditional reprogramming of epithelial cells. *Am J Pathol* 180:599-607. PMID: 22189618
28. Nelson C M, Bissell M J (2006) Of extracellular matrix, scaffolds, and signaling: tissue architecture regulates development, homeostasis, and cancer. *Annual review of cell and developmental biology* 22:287-309. PMID: 16824016
29. Nelson C M, Bissell M J (2005) Modeling dynamic reciprocity: engineering three-dimensional culture models of breast architecture, function, and neoplastic transformation. *Seminars in cancer biology* 15:342-352. PMID: 15963732
30. Provenzano P P, Inman D R, Eliceiri K W, Trier S M, Keely P J (2008) Contact guidance mediated three-dimensional cell migration is regulated by Rho/ROCK-dependent matrix reorganization. *Biophysical journal* 95:5374-5384. PMID: 18775961
31. Kim D-H, Provenzano P P, Smith C L, Levchenko A (2012) Matrix nanotopography as a regulator of cell function. *The Journal of cell biology* 197:351-360. PMID: 22547406
32. Jeon J S, Bersini S, Gilardi M, Dubini G, Charest J L, Moretti M, Kamm R D (2015) Human 3D vascularized organotypic microfluidic assays to study breast cancer cell extravasation. *Proceedings of the National Academy of Sciences of the United States of America* 112:214-219. PMID: 25524628
33. Kleinman H K, Martin G R (2005) Matrigel®: basement membrane matrix with biological activity. *Seminars in cancer biology* 15:378-386. PMID: 15975825
34. Hu Z-Z, Kagan B L, Ariazi E A, Rosenthal D S, Zhang L, Li J V, Huang H, Wu C, Jordan V C, Riegel A T, Wellstein A (2011) Proteomic analysis of pathways involved in estrogen-induced growth and apoptosis of breast cancer cells. *PLoS ONE* 6:e20410. PMID: 21738574
35. Hu Z-Z, Huang H, Wu C H, Jung M, Dritschilo A, Riegel A T, Wellstein A (2011) Omics-based molecular target and biomarker identification. *Methods Mol Biol* 719:547-571. PMID: 21370102

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention. All documents and patent applications cited herein are incorporated in their entireties by reference.

The invention claimed is:
1. An apparatus for isolating invasive cells comprising:
 a chamber array comprising:
  a first chamber housing a mixture of cells;
  a second chamber;
  a cell permeable membrane disposed between the first chamber and the second chamber, the cell permeable membrane having an extracellular matrix (ECM) material coated on a surface of the cell permeable membrane facing an interior of the first chamber;

an electrode array disposed between the cell permeable membrane and the second chamber;

a third chamber housing a tissue culture media, the tissue culture media comprising cells that produce one or more chemoattractants;

a membrane disposed between the second chamber and the third chamber, the membrane permeable to proteins and small molecule drugs; and an electrical cell impedance sensing reader coupled with the electrode array for collecting impedance readouts therefrom in real-time, wherein invasive cells from the mixture of cells are extractable from the second chamber for characterization using the collected impedance readouts.

2. The apparatus of claim 1, wherein the invasive cells are cancer cells.

3. A method for isolating invasive cells comprising:

using the apparatus of claim 1, collecting impedance readouts from the electrical cell impedance sensing reader in real-time;

extracting invasive cells from the second chamber; and characterizing the extracted invasive cells using the collected impedance readouts.

4. The method of claim 3, wherein the extracted invasive cells are analyzed by RNA sequencing or single cell mass spectrometry.

* * * * *